(12) United States Patent
Lee et al.

(10) Patent No.: US 10,167,970 B2
(45) Date of Patent: Jan. 1, 2019

(54) SAFE VALVE FOR HIGH PRESSURE REGULATOR

(71) Applicant: MOTONIC CORPORATION, Seoul (KR)

(72) Inventors: Sang Ryul Lee, Daegu (KR); Wan Jae Jeon, Daegu (KR); Sung Kyung Gi, Daegu (KR); Sung Gil Jang, Daegu (KR); Yun Ho Jeong, Daegu (KR)

(73) Assignee: MOTONIC CORPORATION, Seoul (KR)

( * ) Notice: Subject to any disclaimer, the term of this patent is extended or adjusted under 35 U.S.C. 154(b) by 136 days.

(21) Appl. No.: 15/375,935

(22) Filed: Dec. 12, 2016

(65) Prior Publication Data
US 2018/0100596 A1    Apr. 12, 2018

(30) Foreign Application Priority Data
Oct. 11, 2016  (KR) .................. 10-2016-0131516

(51) Int. Cl.
*F16K 31/12* (2006.01)
*F16K 17/04* (2006.01)
(Continued)

(52) U.S. Cl.
CPC ............ *F16K 17/048* (2013.01); *F16K 17/00* (2013.01); *G05D 16/04* (2013.01);
(Continued)

(58) Field of Classification Search
CPC ......... Y10T 137/2607; Y10T 137/7794; Y10T 137/7829; Y10T 137/7856
See application file for complete search history.

(56) References Cited

U.S. PATENT DOCUMENTS 2,115,512 A * 4/1938 Vincent .............. G05D 16/0655
                                                        137/505.11
2,819,728 A * 1/1958 Gage .................... G05D 7/0106
                                                        137/505.11
(Continued)

FOREIGN PATENT DOCUMENTS

JP       2011-027180 A      2/2011
JP       2014-092280 A      5/2014
(Continued)

*Primary Examiner* — Robert K Arundale
(74) *Attorney, Agent, or Firm* — Novick, Kim & Lee, PLLC; Jae Youn Kim (57) ABSTRACT

The present invention relates to a safe valve for a high pressure regulator, which includes: a guide body coupled to a valve port prepared at a body of a high pressure regulator; a valve body couple to an upper end part of the guide body to open the valve port when the overpressure occurs in a state that the valve port is closed; a lower spring installed inside the valve body for providing elastic force to the valve body; and a discharging pipe couple to a lower part of the guide body for discharging the fuel upon an opening operation of the valve body, wherein a function for a relief valve to relieve the overpressure by discharging the fuel when the overpressure is generated inside the high pressure regulator and a function for a purge valve separated from the body to discharge fuel inside the high pressure regulator are integrally provided.

5 Claims, 4 Drawing Sheets (51) Int. Cl.
*G05D 16/04* (2006.01)
*H01M 8/04089* (2016.01)
*F16K 17/00* (2006.01)
*G05D 16/06* (2006.01)

(52) U.S. Cl.
CPC .... *G05D 16/0663* (2013.01); *H01M 8/04104* (2013.01); *Y10T 137/7794* (2015.04); *Y10T 137/7826* (2015.04)

(56) References Cited

U.S. PATENT DOCUMENTS

| | | | | |
|---|---|---|---|---|
| 2,918,081 | A * | 12/1959 | Lauer, Jr. | F16K 31/60 137/505.11 |
| 3,952,691 | A * | 4/1976 | Peltz | G01L 7/16 116/272 |
| 4,016,897 | A * | 4/1977 | Asioli | F16N 23/00 137/107 |
| 4,168,723 | A * | 9/1979 | Schneider | F16K 17/04 137/542 |
| 4,782,850 | A * | 11/1988 | Duffy | G05D 16/0686 137/116.5 |
| 2002/0083980 | A1 * | 7/2002 | Nakajima | G05D 16/0663 137/505.41 |
| 2005/0067022 | A1 * | 3/2005 | Istre, Jr. | F16L 37/252 137/515.5 |
| 2008/0047618 | A1 * | 2/2008 | Ishikawa | G05D 16/163 137/505 |
| 2010/0077677 | A1 * | 4/2010 | Floyd | E02D 29/12 52/169.14 |

FOREIGN PATENT DOCUMENTS

| | | |
|---|---|---|
| KR | 10-0946204 B1 | 3/2010 |
| KR | 10-1072361 B1 | 10/2011 |
| KR | 10-1134645 B1 | 4/2012 |
| KR | 10-1134647 B1 | 4/2012 |

* cited by examiner

SAFE VALVE FOR HIGH PRESSURE REGULATOR

BACKGROUND OF THE INVENTION

1. Field of the Invention

The present invention relates to a safe valve for a high pressure regulator, and more specifically, to a safe valve for a high pressure regulator, which is applied to the high pressure regulator decompressing high pressure of fuel into preset outlet pressure, thereby relieving overpressure and discharging the fuel.

2. Description of the Related Art

In general, a hydrogen fuel cell electric vehicle (FCEV) uses electric energy as power source at a stack by using oxygen and hydrogen and electrochemically generating electricity to directly convert chemical energy of fuel into electric energy.

The hydrogen FCEV is an ideal technology having high efficiency with no contaminants because it continuously generates power regardless of a cell capacity by supplying fuel and air from the outside. Accordingly, various development efforts are in progress for the hydrogen FCEV.

The hydrogen FCEV provides hydrogen fuel from a fuel tank to the stack via a high pressure regulator and a low pressure regulator, and a hydrogen blower includes a pump and various valves connected to the low pressure regulator.

In addition, the hydrogen FCEV further includes a rapid thawing water tank, an electric water pump, a thermostat, a stack cooling radiator, an air-conditioner condenser, an electric coolant compressor, a water tank, a humidifier, a driving motor, various controllers, an air blower, an air filter, and so on.

A fuel supply system of the hydrogen FCEV, which corresponds to an engine of a normal gasoline or diesel vehicle, is positioned at an upper frontal side of a vehicle.

For example, an applicant of the subject application has disclosed a fuel supply system and a regulator of the hydrogen FCEV, and a controlling technology thereof in several documents such as patent documents 1 to 4 which are denoted below and registered now.

The high pressure regulator which is applied to the hydrogen FCEV deals with hydrogen having high pressure of about 700 bar, so stable outlet pressure, sufficient pressure-resistance and internal airtightness are very important.

The high pressure regulator is equipped with an overpressure relief valve for relieving overpressure upon the overpressure caused by a malfunction, and a fuel discharging valve for discharging inner fuel.

As related arts, there are Korean Patent Registration No. 10-1134645 (Issued on Apr. 9, 2012), Korean Patent Registration No. 10-1134647 (Issued on Apr. 19, 2012), Korean Patent Registration No. 10-0946204 (Issued on Mar. 8, 2010), and Korean Patent Registration No. 10-1072361 (Issued on Oct. 12, 2011).

SUMMARY OF THE INVENTION

However, related arts have problems in that volume and weight of a product are increased, pipes connected to each valve are complicated, and workability is decreased upon assembling work, because an overpressure relief valve and a fuel discharging valve, which perform functions similar to each other, are separately installed at a high pressure regulator.

Accordingly, the high pressure regulator according to the related art has problems in that a mounting space is increased and managing points are increased upon vehicular maintenance and management work.

To solve the problems mentioned above, an integrated valve for integrating the overpressure relief valve and the fuel discharging valve is applied, however, the integrated valve has problems in that components of the integrated valve may be missed because the components are completely separated when the separation process is carried out for the fuel discharge function or reliability is degraded in the reassembling work.

The object of the present invention is to solve the problems as mentioned above, and to provide the safe valve for the high pressure regulator, which is applied to a high pressure regulator for decompressing high pressure of the fuel into preset outlet pressure, thereby integrally providing functions to relieve the overpressure and discharge the fuel.

Another object of the present invention is to provide the safe valve for the high pressure regulator, for preventing the components from being completely separated during separation work from the high pressure regulator.

Still another object of the present invention is to provide the safe valve for the high pressure regulator, which can be easily reassembled after the separation from the high pressure regulator.

To achieve the object as mentioned above, the safe valve for the high pressure regulator according to the present invention includes: a guide body coupled to a valve port prepared at a body of a high pressure regulator; a valve body couple to an upper end part of the guide body and opening the valve port when the overpressure occurs in a state that the valve port is closed; a lower spring installed inside the valve body for providing elastic force to the valve body; and a discharging pipe couple to a lower part of the guide body for discharging the fuel upon an opening operation of the valve body, wherein a function for a relief valve to relieve the overpressure by discharging the fuel when the overpressure is generated inside the high pressure regulator and a function for a purge valve separated from the body to discharge fuel inside the high pressure regulator are integrally provided.

As mentioned above, according to the present invention, the safe valve for the high pressure regulator integrally provides a function for discharging the overpressure through the discharging pipe and a function for discharging the fuel inside the high pressure regulator, upon the overpressure due to a malfunction.

Further, according to the present invention, an integrated safe valve is applied, thus volume and weight of a product are minimized and pipes connected to the safe valve are simplified, so that workability is improved upon assembly work.

In addition, according to the present invention, a separation preventing pin is coupled to one side of the guide body to prevent the discharging pipe from being completely separated from the guide body, so that the discharging pipe is easily reassembled after separated from the high pressure regulator and reliability of a product is secured after reassembled.

DETAILED DESCRIPTION OF THE INVENTION

A safe valve for a high pressure regulator according to a preferable embodiment of the present invention will be described in detail with reference to the accompanying drawings.

First, referring to FIGS. 1 to 3 according to a preferable embodiment of the present invention, the configuration of a high pressure regulator to which a safe valve is applied will be described.

Figure 1:
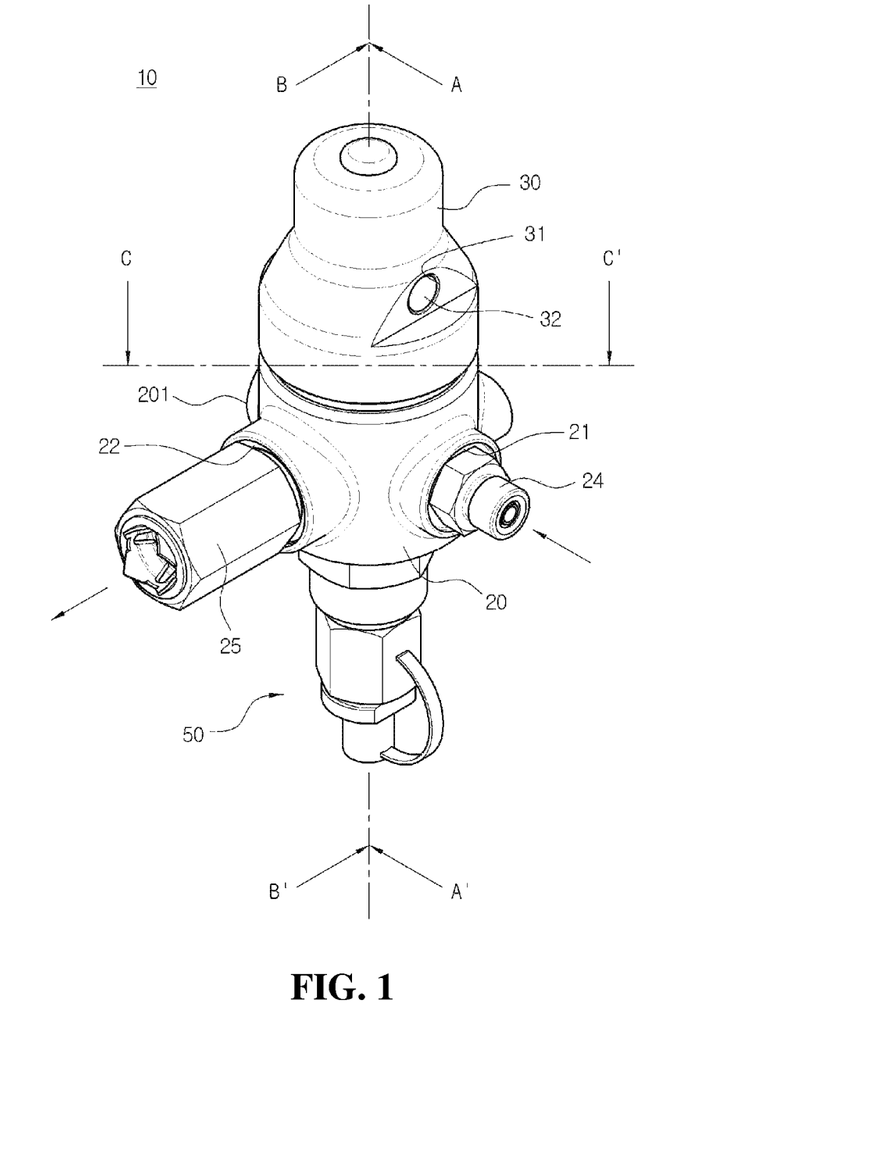
FIG. 1 is a perspective view showing a high pressure regulator to which a safe valve is applied according to a preferable embodiment of the present invention.
Figure 2:
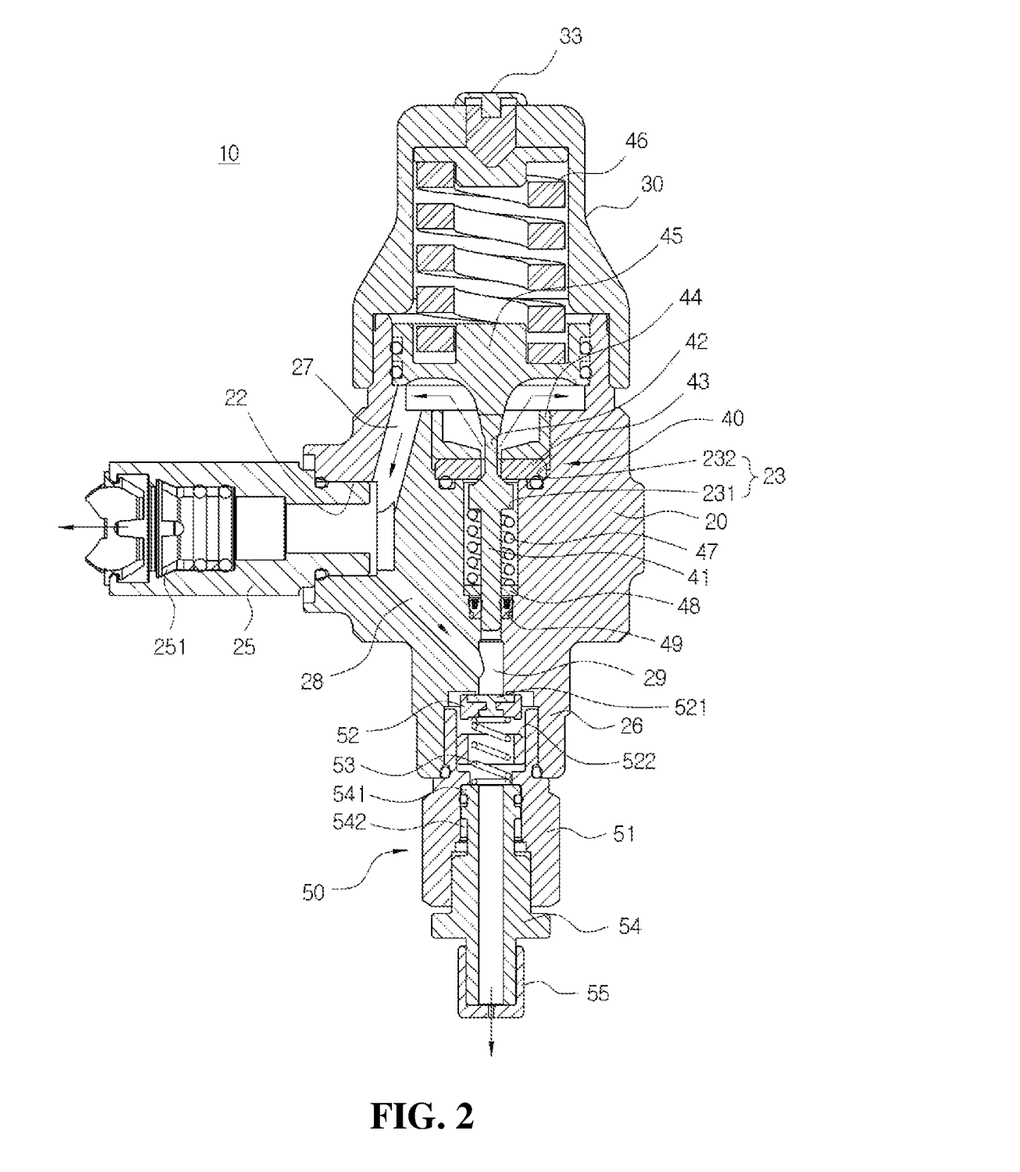
FIG. 2 is a sectional view taken along line A-A' of FIG. 1.
Figure 3:
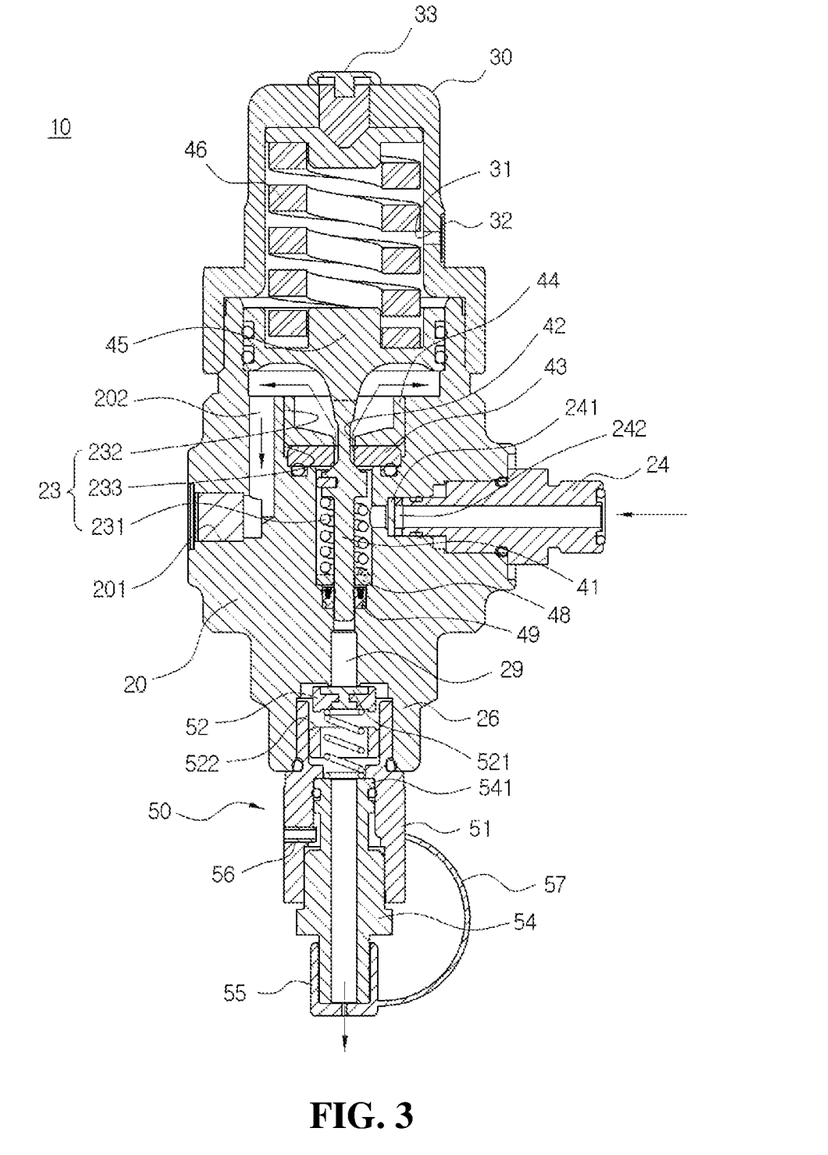
FIG. 3 is a sectional view taken along line B-B' of FIG. 1.

FIG. 1 is a perspective view showing the high pressure regulator to which the safe valve is applied according to the preferable embodiment of the present application, FIG. 2 is a sectional view taken along line A-A' of FIG. 1, and FIG. 3 is a sectional view taken along line B-B' of FIG. 1.

Hereinafter, the term indicating a direction such as "left", "right", "front", "rear", "upper" and "lower" is defined to indicate each direction, respectively, on the basis of the state shown in the drawings.

Although the safe valve, which is applied to a hydrogen FCEV, for the high pressure regulator is described in the embodiment, the present invention is not limited thereto and may be applied to a safe valve for a high pressure regulator to supply to an engine by decompressing various kinds of high pressure of fuel such as liquefied petroleum gas (LPG) fuel or compressed natural gas (CNG) fuel.

The high pressure regulator applied thereto with the safe valve according to the preferable embodiment of the present invention, as shown in FIGS. 1 to 3, may include a body 20 separately formed at side surfaces thereof with an inlet 21 introduced thereto with the high pressure fuel and an outlet 22 for discharging decompressed fuel, and formed therein with a decompression chamber 23 for decompressing the high pressure of the fuel into preset pressure; an upper cover 30 coupled to an upper portion of the body 20; a decompression part 40 installed inside the decompression chamber 23 and moving the high pressure fuel through an orifice to decompress the high pressure of the fuel; and a safe valve 50 coupled to a lower portion of the body 20 for discharging the fuel in an overpressure state, in which pressure of the fuel discharged through the outlet 22 exceeds preset reference pressure.

The body 20 may be formed in a shape of an approximate cylinder having open upper and lower surfaces to form therein with decompression chamber 23, the inlet 21 introduced thereto with the fuel and the outlet 22 for discharging the fuel may be formed at side surfaces of the body 20, and an inlet port 24 and an outlet port 25 which are modularized may be coupled to the inlet 21 and the outlet 22, respectively, to improve workability upon assembly work.

The inlet port 24 and the outlet port 25 may be coupled to the inlet 21 and outlet 22, respectively, and an inlet-side filter 241 may be installed at an inner end of the inlet port 24 to remove foreign substances included in the fuel.

Further, a buffer member 242 having a circular ring shape may be installed between the inlet 21 and the inlet port 24 to compensate for a gap between the inlet-side filter 241 and the inlet port 24.

The buffer member 242 is manufactured using elastic synthetic resin material or metallic material, and elastically deformed when the inlet port 24 is coupled thereto, thereby compensating for and tightly sealing the gap between the inlet-side filter 241 and the inlet port 24.

A quick connector 251 may be installed inside the outlet port 25 to easily couple a connection pipe (not shown) connected to a stack.

The quick connector also may be applied to the inlet port 24.

The decompression chamber 23, as a space to install the decompression part 40, may include a first installation space 231 installed thereat with a shaft 41 of the decompression part 40 described below, and a second installation space 232 installed thereat with a decompression plate 43 and a decompression member 44 each formed thereat with an orifice 42 to be opened and closed by elevation actions of the shaft 41.

A sealing member 49 may be installed at a lower end portion of the first installation space 231 to seal an outer circumferential surface of a lower end of the shaft 41 and a first installation space 231 with respect to a third flow path 29.

A valve port 26 coupled to the safe valve 50 may be provided at a lower portion of the body 20.

In addition, a first flow path 27 for transferring the fuel decompressed in the decompression chamber 23 to the outlet port 25 and a second flow path 28 for partially transferring the fuel discharged through the outlet port 25 to the safe valve 50 may be formed inside the body 20.

The valve port 26 may be connected to the third flow path 29 communicating with the first installation space 231 of the decompression chamber 23 and a lower end of the second flow path 28, and an upper end portion of the safe valve 50 may be inserted inside the valve port 26.

At this point, the first and second flow paths 27 and 28, as shown in FIG. 2, may be slantingly formed toward a lower left side and a lower right side at preset angles, respectively, on the basis of the feature of the fuel flowing along the outer circumferential surface of the shaft 41 after the fuel passes through the orifice 42.

Accordingly, the decompressed fuel in the decompression chamber 23 may smoothly move toward the outlet port 25 and the valve port 26 through the first and second flow paths 27 and 28 which are slantingly formed.

Therefore, according to the present invention, fluid resistance is minimized by slantingly forming the flow path inside the body, thereby effectively preventing internal fuel insufficiency which is intermittently incurred upon operations.

Further, as shown in FIGS. 1 to 3, a sensor port 201 coupled to a measuring sensor (not shown) may be provided at another side surface of the body 20 to measure pressure of the decompressed fuel.

A connection flow path 202 for connecting the decompression chamber 23 to the sensor port 201 may be formed between the decompression chamber 23 and the sensor port 201, to enable the measuring sensor to measure the pressure of the decompressed fuel.

Therefore, the measuring sensor may measure the pressure of the decompressed fuel, and a control unit (not shown) provided at the vehicle may receive a measuring signal of the measuring sensor, check up the pressure of the decompressed fuel, and determine whether the operation is normally performed.

An upper cover 30 is formed in a cylindrical shape having an open lower surface, and a piston 45 of the decompression part 40 described below and an upper spring 46 for providing restoring force to the piston 45 may be installed inside the upper cover 30.

A vent hole 31 for introducing or discharging air may be formed at one side of the upper cover 30 to enable the shaft 41 to smoothly move in the vertical direction, and a filler may be installed at the vent hole 31 to block an introduction of foreign substances such as water, oil, and dusts during an introduction of external air.

The filter 32 may be manufactured using synthetic resin materials such as polytetrafluoroethylene having excellent heat resistance and chemical resistance, and may be installed at the vent hole 31 in an adhesive manner.

The present invention is not limited to the above and may be modified to apply a wire compression mesh filter.

However, the wire compression mesh filter has a limit to completely block small-sized particles such as dusts and water, while it is able to filter foreign substances having large-sized particles.

Therefore, according to the present invention, the introduction of water, oil and foreign substances caused by fragments or flood of a road and high pressure sprinkling may be prevented due to the mounting height of the high pressure regulator mounted at a lower part, which is in proximity to a road surface, of the vehicle, and the filter may be easily installed, by adhesively installing the filter at the vent hole formed at the upper cover.

A tension adjustment tool 33 may be coupled to an upper end of the upper cover 30 to adjust tension of the upper spring 46 applied to the decompression part 40 described below.

The decompression part 40 may include: the shaft 41 installed inside the decompression chamber 23 to move up and down in the vertical direction; the decompression plate 43 and the decompression member 44 respectively formed at central portions thereof with orifices 42 and installed in the second installation space 232 of the decompression chamber 23; the piston 45 vertically moved depending on the pressure of the decompressed fuel supplied into the decompression chamber 23; and the upper spring 46 for providing the restoring force to the piston 45.

The shaft 41 extends lengthways along the longitudinal direction, and a central portion of the shaft 41 may have a larger diameter in comparison with upper and lower end portions thereof to close the orifice 42.

The decompression plate 43 may be formed in a disk shape to correspond to a cross section of the decompression chamber 23, and the decompression member 44 may be formed in an approximately cylindrical shape having open upper and surfaces, disposed at a top of the decompression plate 43, and press-fitted and fixed to an inner circumferential surface of the decompression chamber 23.

The orifices 42 may be formed at the central portions of the decompression plate 43 and the decompression member 44, respectively.

An upper end portion of the shaft 41 may be installed to make contact with a bottom surface of the piston 45 by penetrating through the orifices 42 of the decompression plate 43 and the decompression member 44.

The piston 45 is formed in an approximately cylindrical shape having an open upper surface, and at least one O-ring may be installed at an outer circumferential surface of the piston 45 to seal between an inner circumferential surface of the upper cover 30 and the piston 45.

The piston 45 vertically moves according to pressure changes of the fuel decompressed during passing through the orifice 42, and the shaft 41 opens or closes the orifice 42 by vertically interlocking with the vertical movement of the piston 45.

At this point, the upper end portion of the shaft 41 and the bottom surface of the piston 45 making contact therewith may be formed in a streamlined and curved surface and in an approximate trumpet shape, to minimize resistance when the fuel moves.

Therefore, according to the present invention, the upper end portion of the shaft 41 and the bottom surface of the piston 45 are formed in the streamlined and curved surface to minimize fluid resistance, thereby effectively preventing the internal fuel insufficiency which is intermittently incurred upon the operations.

According to an experimental result as described in the embodiment, in the case that each of the first and second flow paths 27 and 28 is slantingly formed and the upper end portion of the shaft 41 and the bottom surface of the piston 45 are formed in the streamlined and curved surface, pressure loss is improved to about 90% compared with the case that the first and second flow paths 27 and 28 are vertically formed and the upper end portion of the shaft 41 and the bottom surface of the piston 45 are formed in a planar shape.

The decompression part 40 may further include an intermediate spring 47 installed at a lower portion of the shaft 41 for providing elastic force to the shaft 41 to close the orifice 42, a support plate 48 for supporting a lower end of the intermediate spring 47, and a sealing member 49 for sealing between the decompression chamber 23 and the valve port 26.

The sealing member 49 may, including an auxiliary portion to reinforce airtightness of a spring energized seal, be provided with a structure to be accommodated in the body 20 to preserve low pressure at the lower portion of the shaft 41.

The spring energized seal may be configured to have a structure to accommodate an elastic portion, which is a SUS-based thin spring, on a blade portion of a body part having resin material and an arc shape, such that the airtightness with respect to a variable pressure range is constantly maintained.

Accordingly, the sealing member 49 makes tight contact with the body 20 and the shaft 41 in a pressurized state at the same time, and sustains the sealing between most area of the shaft 41 to which high pressure operated and the lower end the shaft 41 of low pressure.

The support plate 48 may be formed in an approximate disk shape, and an insertion hole inserted therein with a lower end portion of the shaft 41 may be formed at a central portion of the support plate 48.

The support plate 48 may be arranged at an upper portion of the sealing member 49 coupled to a lower end portion of the first installation space 231 of the decompression chamber 23, At this point, the support plate 48 may be manufactured using synthetic resin material such as polyether ether ketone excellent in heat resistance, chemical resistance, and impact resistance, to prevent damage of an outer surface of the shaft 41 due to friction with the support plate 48 upon the elevation actions of the shaft 41.

Therefore, the support plate inserted therein with the lower end portion of the shaft is manufactured using synthetic resin materials, so that the present invention may prevent damage of the outer surface of the shaft due to friction with the support plate upon the elevation actions of the shaft.

Accordingly, the present invention may prevent insufficiency of high pressure sealing performance and insufficiency of internal pressure due to damage of the shaft.

A rotation preventing pin (not shown) may be installed at one side of the central portion of the shaft 41 to prevent rotation of the shaft 41.

One end of the rotation preventing pin may be coupled to one side surface of the central portion of the shaft 41, and an opposite end of the rotation preventing pin may be inserted into a movement groove 233 recessed at one side of the second installation space 232 of the decompression chamber 23 along the longitudinal direction.

Therefore, according to the present invention, the rotation preventing pin is installed at one side surface of the shaft, and the movement groove is formed at one side of the decompression chamber, thereby preventing minute rotation upon the elevation actions of the shaft, thus a sealing point may be sustained for a long time.

However, the present invention also may be modified to couple the one end of the rotation preventing pin to the one side of the second installation space, and to insert the opposite end of the rotation preventing pin into the movement groove formed on the shaft.

On the other hand, the configuration of the high pressure regulator is described in detail in the embodiment, however, the present invention is not limited thereto and the present invention may be modified to be applied to the high pressure regulators having various shapes with the valve port.

Hereinafter, the configuration of the safe valve of the high pressure regulator according to the preferable embodiment of the present invention will be described in detail with reference to FIGS. 2 to 4.

Figure 4:
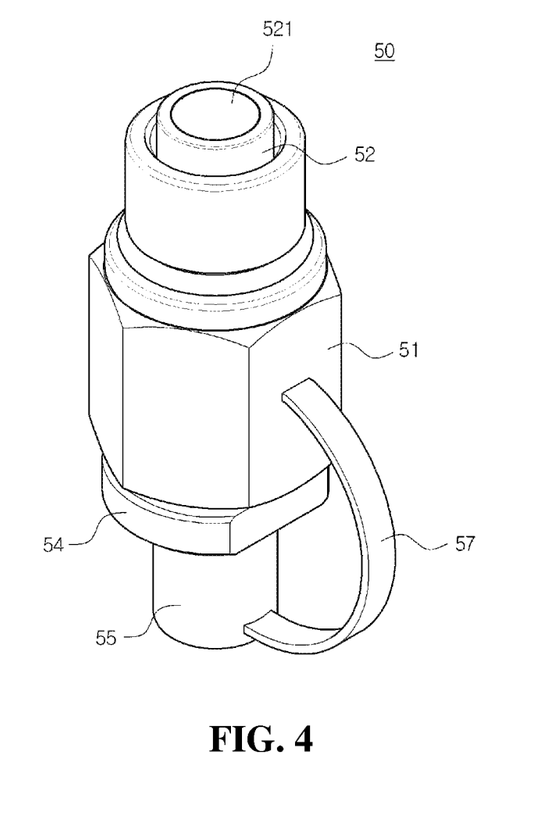
FIG. 4 is a perspective view showing a safe valve for a high pressure regulator according to a preferable embodiment of the present invention.

FIG. 4 is a perspective view showing the safe valve for the high pressure regulator according to the preferable embodiment of the present invention.

As shown in FIGS. 2 to 4, the safe valve 50 for the high pressure regulator according to a preferable embodiment of the present invention may integrally provide a function for a relief valve to relieve the overpressure by discharging the fuel when abnormal overpressure occurs inside the high pressure regulator 10, and a function for a purge valve manually separated from the body 20 by a worker to discharge the fuel inside the high pressure regulator 10.

To this end, the safe valve 50 may include a guide body 51 coupled to the valve port 26 of the body 20; a valve body 52 couple to an upper end portion of the guide body 51 to open the valve port 26 when the overpressure occurs in a state that the valve port 26 is closed; a lower spring 53 installed inside the valve body 52 for providing elastic force to the valve body 52; and a discharging pipe 54 coupled to a lower portion of the guide body 51 for discharging fuel upon an opening operation of the valve body 52.

In addition, the safe valve 50 may further include a pipe cap 55 coupled to a lower end portion of the discharging pipe 54 and a separation preventing pin 56 for preventing the discharging pipe 54 from being completely separated from the guide body 51.

The guide body 51 may be formed in an approximately cylindrical shape having open upper and lower surfaces, and the upper end portion of the guide body 51 may have a diameter smaller than a diameter of a lower end portion thereof, and be coupled inside the valve port 26.

An O-ring may be installed at the upper end portion of the guide body 51, in a state that the O-ring is coupled to an inner circumferential surface of the valve port 26, to prevent the fuel from being leaked to the outside of the guide body 51.

The valve body 52 may be formed in an approximately cylindrical shape having an open lower surface, and a molding seat 521 may be installed at an upper end of the valve body 52 to close the third flow path 29 connected to an inner space of the valve port 26.

At least one inlet hole 522 may be formed at a side surface of the valve body 52 to introduce the fuel, which is discharged to the valve port 26, into the inside thereof.

A lower spring 53 may be arranged inside the valve body 52, and a lower end of the lower spring 53 may be supported against an upper end of the discharging pipe 54 coupled to the guide body 51.

Accordingly, when pressure of the fuel transferred through the third flow path 29 exceeds the preset pressure in a state of closing the third flow path 29 due to elastic force of the lower spring 53, the valve body 52 moves downward while elastically deforming the lower spring 53 such that a length of the lower spring 53 is reduced, thereby opening the third flow path 29.

Therefore, according to the present invention, the fuel in the overpressure state is discharged through the discharging pipe by using the safe valve to prevent the fuel in the overpressure state from being supplied to the stack, so that safety may be improved.

An annular rib 541, which protrudes toward the outside to correspond to an inner circumferential surface of the guide body 51, may be formed at an outer circumferential surface of the upper end portion of the discharging pipe 54, and a central portion of the discharging pipe 54 may have a larger diameter in comparison with that of an upper end portion thereof.

An O-ring may be installed at the annular rib 541 to seal between the inner circumferential surface of the guide body 51 and the discharging pipe 54.

Accordingly, the fuel moves only through a flow path inside the discharging pipe 54 and is discharged to the outside upon relieving the overpressure and discharging the fuel, by installing the O-ring at the annular rib 541.

In general, the worker discharges the fuel at a separate storage tank or at a high ground storage by connecting a hose to a lower end portion of the discharging pipe when discharging the fuel.

Therefore, according to the present invention, the O-rings are respectively installed at the guide body and the annular rib to prevent the fuel from being leaked to the outside, thus the fuel is discharged only through the flow path inside the discharging pipe upon relieving the overpressure and discharging the fuel, so that an accident caused by discharge of the fuel may be prevented.

The separation preventing pin 56 is installed by penetrating through one side surface of the guide body 51, and an inner end of the separation preventing pin 56 is inserted into a moving space 542 formed between the annular rib 541 and a central portion of the discharging pipe 54.

Accordingly, a distance for separating the discharging pipe 54 from the body 20 may be limited within the moving space 542 between the annular rib 541 and the central portion, when the purge valve is operated to discharge the fuel inside the high pressure regulator 10.

Therefore, according to the present invention, the discharging pipe is prevented from being completely separated from the body by using the separation preventing pin, thereby preventing the valve body and the lower spring installed inside the guide body from being lost upon separation.

According to the present invention, although the embodiment describes that the annular rib 541 is formed at the upper end portion of the discharging pipe 54, screw threads may be formed to easily assemble the discharging pipe 54 to the guide body 51 or separate the discharging pipe 54 from the guide body 51 by rotating the discharging pipe 54 about the outer circumferential surface of the annular rib 541.

In addition, the inner circumferential surface of the guide body 51 may have screw threads at a portion to which the annular rib 541 is coupled so as to correspond to the screw thread of the annular rib 541.

Therefore, according to the present invention, the screw thread is formed at the inner circumferential surface of the guide body and the upper end portion of the discharging pipe, so that the discharging pipe may be rotated to be assembled with the body or may be easily separated from the body.

The pipe cap 55 may be coupled to the lower end portion of the discharging pipe 54 and coupled to be separable from the discharging pipe 54 when the pressure is equal to or greater than the preset pressure, such that the fuel is discharged upon the overpressure.

Accordingly, the worker may check whether the pipe cap 55 is separated upon inspection of the vehicle, thus an occurrence of the overpressure is easily determined, and a precise diagnosis may be performed when the overpressure is confirmed.

The pipe cap 55 may be coupled to the outer circumferential surface of the discharging pipe 54 to prevent the pipe cap from missing in the case of separation from the discharging pipe 54, and may be connected to the discharging pipe 54 by a connecting member 57 having one end connected to the pipe cap 55.

Hereinafter, an engaging relation and an operational method of the safe valve for the high pressure regulator according to a preferable embodiment of the present invention will be described.

By the worker, the lower spring 53 is coupled to an inner space of the valve body 52, the valve body 52 coupled to the lower spring 53 is coupled to the upper portion of the guide body 51.

In addition, the discharging pipe 54 is inserted and coupled to the lower portion of the guide body 51.

At this point, by the worker, the separation preventing pin 56 is coupled by penetrating through the one side surface of the guide body 51.

Then, the inner end of the separation preventing pin 56 is coupled to the moving space 542 between the annular rib 541 and the central portion, so that a separable distance of the discharging pipe 54 from the guide body 51 is limited within the height of the moving space 542.

When assembly of the safe valve 50 is completed according to the above procedure, the safe valve 50 is assembled with the valve port 26 provided at the lower portion of the body 20.

Subsequently, by the worker, the pipe cap 55 is coupled to the lower end portion of the discharging pipe 54.

Accordingly, when the high pressure fuel is introduced through the inlet port 24, the piston 45 and the shaft 41 are vertically moved according to the pressure of the introduced fuel to pass through the orifice 42, thus the high pressure regulator 10 applied thereto with the safe valve 50 decompresses the fuel and supplies the fuel to the stack.

In addition, the safe valve 50 for the high pressure regulator according to the preferable embodiment of the present invention receives the decompressed fuel through the second and third flow paths 28 and 29 connected to the outlet port 25, and the valve body 52 moves downward when the decompressed fuel is in the overpressure state exceeding the preset pressure, thereby discharging the overpressure fuel to the outside through the discharging pipe 54.

On the other hand, by the worker, whether the pipe cap 55 is separated is inspected upon vehicular maintenance and management work, and the separation of the pipe cap 55 from the discharging pipe 54 is determined as a state of the overpressure due to the malfunction, so that the precise diagnosis may be performed.

In addition, upon the maintenance and management work by the worker, the hose is connected to the lower end of the discharging pipe 54, one end of the hose is arranged to discharge the fuel from the separate storage tank or the high ground storage into the air, and the discharging pipe 54 is rotated in one direction, such that the fuel inside the high pressure regulator 10 may be discharged.

At this point, when the discharging pipe 54 begins to be separated from the guide body 51 while rotating, the compressed height of the lower spring 53 is increased, and the pressure which pushes the molding seat 521 of the valve body 52 is weakened.

Accordingly, the fuel inside the body 20 is slowly discharged to the outside through the discharging pipe 54.

Therefore, according to the present invention, a function for discharging the overpressure through the discharging pipe and a function for discharging the fuel inside the high pressure regulator may be integrally provided when the overpressure occurs.

On the other hand, a separable distance of the discharging pipe 54 is limited by the separation preventing pin 56 coupled to the one side of the guide body 51.

Therefore, according to the present invention, the separation preventing pin is coupled to the one side of the guide body to prevent the discharging pipe from being completely separated from the guide body, so that reassembly is easily performed after the separation from the high pressure regulator and reliability of a product after the reassembly is secured.

As the above, the present invention implemented by the inventor is described in detail according to the embodiment, however, the present invention is not limited to the embodiment and may be variously modified within a range not departing from the scope of the present invention.

Although the safe valve, which is applied to the hydrogen FCEV, for the high pressure regulator is described in the embodiment, the present invention is not limited thereto, but the present invention may be modified to be applied to a safe valve for a high pressure regulator to supply the fuel to an engine by decompressing various kinds of high pressure fuel such as the LPG fuel or the CNG fuel.

In addition, although the configuration of the high pressure regulator is described in detail in the embodiment, the present invention is not limited thereto and may be modified to be applied to high pressure regulators having various shapes and formed thereat with the valve port.

The present invention is applied to a safe valve technology for a high pressure regulator, which integrally provides a function for discharging overpressure through a discharging pipe and a function for discharging fuel inside the high pressure regulator when overpressure occurs.

What is claimed is:

1. A valve for a pressure regulator, the valve comprising: a guide body coupled to a valve port prepared at a body of the pressure regulator; a valve body coupled to an upper end part of the guide body to open the valve port when overpressure occurs in a state that the valve port is closed; a lower spring installed inside the guide body for providing elastic force to the valve body; a discharging pipe coupled to a lower part of the guide body for discharging fuel upon an opening operation of the valve body; and a separation preventing pin for preventing the discharging pipe from being completely separated from the guide body, wherein the valve is configured to relieve the overpressure by discharging the fuel when the overpressure occurs inside the pressure regulator, is configured to be separated from the body of the regulator to discharge the fuel inside the pressure regulator, and wherein the separation preventing pin is installed and penetrates through one side of the guide body, an inner end of the separation preventing pin protrudes into a moving space disposed between an annular rib disposed at an upper end part of the discharging pipe and a central part of the discharging pipe, and a movable distance of the discharging pipe from the guide body is limited within a height of the moving space.

2. The valve of claim 1, wherein a lower end of the lower spring is supported against an upper end of the discharging pipe coupled to the guide body.

3. The valve of claim 1, further comprising a pipe cap configured to be coupled to a lower end of the discharging pipe, wherein the pipe cap is separated from the discharging pipe when pressure is equal to or greater than preset pressure so as to discharge the fuel in an overpressure state when the overpressure occurs, and an inspection for the overpressure is achieved based on a separation of the pipe cap.

4. The valve of claim 2, further comprising a pipe cap configured to be coupled to a lower end of the discharging pipe, wherein the pipe cap is separated from the discharging pipe when pressure is equal to or greater than preset pressure so as to discharge the fuel in an overpressure state when the overpressure occurs, and an inspection for the overpressure is achieved based on a separation of the pipe cap.

5. The valve of claim 3, wherein one end portion of the pipe cap is coupled to an outer circumferential surface of the discharging pipe, and an opposite end portion of the pipe cap is connected to the discharging pipe by a connecting member connected to the pipe cap.

\* \* \* \* \*